Patented Apr. 18, 1939

2,155,054

UNITED STATES PATENT OFFICE 2,155,054

COLORING MATTERS

Arthur Reginald Lowe, Blackley, England, assignor to Imperial Chemical Industries Limited, a corporation of Great Britain No Drawing. Application July 28, 1936, Serial No. 93,125. In Great Britain July 31, 1935

12 Claims. (Cl. 260—319)

In British Specification No. 389,842 there are described a class of new compounds now to be called metal-free phthalocyanines (see Linstead, Lowe, et al. Journal of the Chemical Society, 1934, pages 1017 and 1022) of which the compound $C_{32}H_{18}N_8$ is typical. An alternative formula for this compound is $(C_8H_4N_2)_4H_2$. The compound and its congeners are colored intensely in various shades of blue and hence are useful pigments. In British Specification No. 389,842 their manufacture from orthocyano- aryl-carboxylic amides is described, and in British Specification No. 410,814 another process, namely that of heating an orthoarylene dicyanide in presence or absence of a suitable solvent or diluent such as a nitrogeneous tertiary organic base is described.

The present invention relates to an improvement in the process described in British Specification No. 410,814.

According to the inveniton metal-free phthalocyanines are obtained by heating an ortho-arylene-dicyanide of the benzene or naphthalene series with an ethanolamine.

I have found that when proceeding in this manner the reaction proceeds at considerably lower temperature than in the processes described in the literature above cited, with the result that a much purer product is obtained, since high temperatures favor the formation of by-products. We have further found that when an ethanolamine is employed as tertiary base a much smaller quantity thereof is needed or indeed desirable than would be expected from the aforementioned employment of tertiary bases as diluents.

The common triethanolamine of commerce consists of a mixture of which triethanolamine itself $N(C_2H_4OH)_3$ is a major constituent. This substance, suitably dehydrated if necessary, is a convenient agent for use in the process of the invention.

For the purposes of the invention it is not necessary, and, in fact, is undesirable to use the ethanolamine in large quantity, as a diluent is commonly used, as if that is done the reaction takes place slowly and incompletely. A small proportion will suffice. For the same reason it is undesirable to use another diluent or medium, but the use of such is not excluded from the invention.

The process is conveniently carried into practical effect by mixing the nitrile, which may be molten, with a small proportion of ethanolamine, and heating the mixture further at the temperature at which reaction (which is exothermic) takes place.

Metal-free phthalocyanines are thus obtained in the form of well-defined crystals, and so in a form permitting of ready manipulation, but for conversion into products for use as pigments the crystalline material is necessarily to be dispersed, which is conveniently done by dissolving it in cold concentrated sulphuric acid, and pouring the sulphuric acid solution into water, whereupon the phthalocyanine is precipitated in a fine state of division.

As suitable ortho-arylene-dicyanides of the benzene or naphthalene series may be mentioned phthalonitrile, 3- and 4-chlorophthalonitriles, 3- and 4-nitrophthalonitriles, 4:5-dichlorophthalonitrile, and 1:2-dicyanonaphthalene.

The invention is illustrated, but not limited, by the following examples in which the parts are by weight.

*Example 1*

100 parts of phthalonitrile are heated to 170° C., 13 parts of distilled technical triethanolamine (the fraction boiling above 206° C. at 14 mm. pressure) are added in portions during 2-3 minutes, the temperature rises 5-10° C., and heating is continued for about 4 hours at 170–180° C., with stirring, or stirring as long as the mixture is sufficiently liquid.

The mass is allowed to cool, powdered, boiled with 500 parts of spirit, filtered, washed with alcohol, and dried. The dry coloring matter is in the form of glistening needles with a purple-blue reflex, and a bluish-green streak.

On dissolving in concentrated sulphuric acid it gives a greenish-brown solution, which precipitates the blue coloring matter on pouring into water. The coloring matter is now in a state of fine division, eminently suitable for use as a pigment, as described in British Specifications Nos. 389,842 and 410,814.

*Example 2*

270 parts of 1:2-dicyanonaphthalene are heated to 210° C. conveniently in a vessel surrounded by an oil bath. To the molten nitrile are added 5 parts of triethanolamines. The melt quickly develops a green color. Heating is continued at 220–230° C. for 1½ hrs. after which the mixture is cooled, crushed and extracted with hot ethyl alcohol 100 parts or more, to remove brown by-product, etc. There remains a dark green powder. This is the 1:2-naphthalocyanine of Example 18 of British Specification No. 410,814.

*Example 3*

50 parts of 4:5-dichlorphthalonitriles are heated (oil-bath) at 220° C. To the molten nitrile 0.5 part of triethanolamine is added. Crystals with a deep purple reflex color are quickly formed. Heating is continued for 1½ hrs. at which time the mixture is quite stiff, at 220–225° C. The product was worked up as described in the previous example. Octa (4:5)-chlorophthalocyanine is obtained. This is a new compound.

*Example 4*

20 parts of phthalonitrile are melted as described in Example 1, and 2.6 parts of either monoethanolamine or diethanolamine are added. Metal-free phthalocyanine is rapidly formed at 170–175° C. Heating is continued until no more pigment appears to be formed. The mixture is then worked up as described in Example 1.

In the claims below the phrases "benzene series" and "naphthalene series" refer to benzene and naphthalene, respectively, their homologs and substitution derivatives.

I claim:

1. A process for the manufacture of metal-free phthalocyanines which comprises heating an orthoarylene dicyanide of the benzene or naphthalene series with an ethanolamine.

2. A process for the manufacture of metal-free phthalocyanines which comprises heating an ortho-arylene-dicyanide of the benzene or naphthalene series with a monoethanolamine.

3. A process for the manufacture of metal-free phthalocyanines which comprises heating an ortho-arylene-dicyanide of the benzene or naphthalene series with a diethanolamine.

4. A process for the manufacture of metal-free phthalocyanines which comprises heating an ortho-arylene-dicyanide of the benzene or naphthalene series with a triethanolamine.

5. A process for the manufacture of metal-free phthalocyanines which comprises heating a phthalonitrile with an ethanolamine.

6. A process for the manufacture of metal-free phthalocyanines which comprises heating a chlorophthalonitrile with an ethanolamine.

7. A process for the manufacture of metal-free phthalocyanines which comprises heating a 4:5-dichlorophthalonitrile with an ethanolamine.

8. A process for the manufacture of a metal-free phthalocyanine which comprises heating an ortho-arylene dicyanide in the presence of an ethanolamine.

9. A process for the manufacture of a metal-free phthalocyanine, which comprises heating an ortho-arylene dicyanide with less than its own weight of an ethanolamine.

10. A process for the manufacture of a metal-free phthalocyanine which comprises heating an ortho-arylene dicyanide with from 1 to 13% of its own weight of an ethanolamine.

11. A process for the manufacture of a metal-free phthalocyanine which comprises heating an ortho-arylene dicyanide at a temperature between 170° and 230° C. in the presence of a quantity of an ethanolamine less than the weight of the arylene dinitrile.

12. A process for the manufacture of a metal-free phthalocyanine which comprises heating an ortho-arylene dicyanide having no more than two aryl rings in its structure, at a temperature between 170° to 230° C., in the presence of from 1 to 13% of its own weight of triethanolamine, and recovering the resulting coloring matter.

ARTHUR REGINALD LOWE.